United States Patent Office 3,730,886
Patented May 1, 1973

3,730,886
METHOD OF PURIFYING WATER
Sten Harald Ahrland, Lund, Bengt Göran Fredrik Carleson, Nyköping, and Jarl Sören Lindhe, Tystberga, Sweden, assignors to Aktiebolaget Atomenergi, Stockholm, Sweden
No Drawing. Filed Apr. 26, 1971, Ser. No. 137,690
Int. Cl. B01d 15/04
U.S. Cl. 210—37                    2 Claims

ABSTRACT OF THE DISCLOSURE

Feed water for a boiler, and coolant water for a nuclear reactor, must be of a very high purity. Such a pure water can be produced by treating the feed water with zirconium phosphate and zirconium hydroxide. The zirconium phosphate should be in the form of crystals, the majority of which have a size of from 100 x 200 to 1000 x 2000 angstrom units. The zirconium hydroxide shall be neutral, i.e. release neither acid nor alkaline compounds. This can be achieved by precipitating the hydroxide with ammonia, and treating the precipitated hydroxide with ammonia.

The invention relates to a method of purifying water, particularly coolant water for a nuclear reactor and feed water for a boiler. The primary object of the invention is to effect a method of purifying water which can be used for water having a high temperature, for example 200° C. and higher, and which results in water having an extremely low percentage of foreign anions and cations and having a pH value near 7, preferably 6–8.

The method according to the invention is characterized in that the water is treated with zirconium phosphate and zirconium hydroxide. The method can be carried out in such a way that zirconium phosphate and zirconium hydroxide, both in grain form, are applied mixed in a bed through which the water is passed. However, a preferred method is first to treat the water with zirconium phosphate to remove undesired cations and then to treat the water with zirconium hydroxide which removes undesired anions from the water, including phosphate ions which have been liberated from the zirconium phosphate by hydrolysis.

It is known to use a gel of zirconium phosphate as ion exchanger. However, the primarily precipitated gel is easily hydrolized so that even at pH values around the neutral point it emits considerable quantities of phosphate. Furthermore, its consistency is such that it is difficult to wash it clean from adhering phosphoric acid absorbed during the precipitation. The tendency to colloid formation also means that a bed of such a gel offers a considerable flow resistance which also increases while the solution is flowing through.

It is also known that the tendency to hydrolysis decreases as the size of the grains in the gel increases, and that such an increase can be achieved by treating the gel with a rather concentrated water solution of phosphoric acid, suitable at least 1 M solution, at a high temperature. However, the size of the crystals should not be increased so much that the crystallization becomes complete, forming the well defined monohydrate $Zr(HPO_4)_2 \cdot H_2O$. This compound has considerably poorer ion exchange properties than gels containing crystallites of smaller size.

It should also be noted that an immediate treatment of the precipitated wet gel with phosphoric acid produces a product which has less tendency to hydrolysis but which still has too high flow resistance to be a suitable bed material.

According to the invention it has been found that a zirconium phosphate which combines good sorption characteristics with a slight release of phosphate, and which also offers low flow resistance to the water flowing through should be in micro-crystalline form and that the main proportion of the crystallites should have a size of between 100 x 200 A. and 1000 x 2000 A. (angstrom units). The size of the crystals can be measured in known manner from an X-ray diffractogram. The crystal sized have been indicated above in two directions perpendicular to each other. The higher figure refers to the size in a direction parallel to the layers of zirconium phosphate in the crystal, and the lower figure to the size at right angles to said layers.

Micro-crystalline zirconium phosphate with the above-mentioned crystallite size can be produced by allowing a zirconium salt in a water solution to react with phosphate ions, suitably in the form of phosphoric acid, to form zirconium phosphate, drying the zirconium phosphate thus precipitated at a temperature of 25–75° C., and then treating the dried zirconium phosphate with a water solution of phosphoric acid $H_3PO_4$ having a concentration of 3M–6M for a period of 24–1 hours at a temperature of at least 100° C., preferably at the boiling point of the phosphoric acid solution. This method of production will now be described in more detail.

In principle any water-soluble zirconium salt can be used, but the use of zirconyl nitrate $ZrO(NO_3)_2$ is preferred. For the precipitation a solution is suitably used having a concentration of 0.5–2 mol/l. The phosphoric acid used for the precipitation suitably has a concentration of 0.5–1 mol/l. The precipitated gel is suitably stirred in contact with the mother liquor until its percentage of phosphoric acid no longer drops. The quantities of starting material should be chosen so that the molecular ratio P:Zr in the gel can reach the upper limit value 2, towards which the ratio tends at a sufficient excess of phosphate. The gel then has substantially the composition

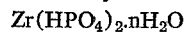
$$Zr(HPO_4)_2 \cdot nH_2O$$

The gel is separated from the mother liquor, preferably by means of centrifugal separation, and is washed once with a diluted phosphoric acid solution, preferably having a concentration of about 1 percent by weight. The gel is then separated from the washing liquid. Further washing should be avoided as this would give rise to strong colloid formation.

The washed gel is dried at a temperature of 25–75° C., suitably about 50° C. The drying is continued until the weight decrease of the gel caused by evaporation ceases. The dried gel is crushed to powder, suitably having a grain size of 0.25–0.50 mm. (30–60 mesh). If desired, fine particles may be removed, suitably by suspension of the powder in water and repeated decanting.

The powder thus obtained is now treated with phosphoric acid having a concentration of between 3 and 6 mol/l. for a period of between 1 and 24 hours. The temperature should be at least 100° C. and the acid solution is preferably allowed to boil during the treatment. It has been found that, thanks to the previous drying of the gel, the colloid formation during the acid treatment will be reasonable and the mechanical properties of the grain are not essentially altered.

After the acid treatment, the gel is separated from the acid, suitably by centrifugal separation, and washed once or twice with water. Further washing of the wet gel should be avoided as this would give rise to colloid formation. The gel is again dried to equilibrium at 50° C. It can then be washed entirely free from phosphoric acid, preferably in a column, without colloid formation occurring. After this wash the gel is again dried at 50° C. and is then ready for use.

Zirconium hydroxide is produced by precipitating a zirconium salt in water solution with alkali. Zirconyl nitrate $Zr(NO_3)_2 \cdot 2H_2O$ is suitably used as the zirconium salt. Sodium hydroxide may be used as alkali. Even with a fairly slight excess of alkali, the reaction solution will then be so basic that H+ is to a considerable extent replaced by Na+. This substitution of Na+ for H+ occurs readily since Na+ is absorbed rather eagerly. Zirconium hydroxide precipitated in this way gives clean water a pH value of about 11. It is also possible to precipitate the zirconyl nitrate with a weaker base, such as ammonia. However, with reasonable concentrations of zirconyl nitrate and ammonia, this does not lead to a full hydrolysis of the zirconyl nitrate. A hydroxide nitrate precipitate is obtained which releases nitric acid to clean water, resulting in a pH value of about 3.

The zirconium hydroxide used for the water purification according to the invention should not release either acid or alkaline compounds, however. Such a zirconium hydroxide can be produced by permitting a zirconium salt in water solution to react with ammonia and then treating the precipitated zirconium hydroxide with a water solution of ammonia in a concentration of 3–6 mol/l. The hydroxide is suitably treated twice with the ammonia solution of the given concentration, each time for at least 2 hours, suitably 8 hours. The treatment temperature is suitably ambient or slightly raised temperature, for example 25–40° C.

It is suitable to dry the zirconium hydroxide prior to the treatment with the ammonia solution and, if several treatments are performed, between each such treatment. The drying is best performed at about 50° C. and is continued until the weight decrease caused by evaporation ceases. The product is also suitably dried in this way after the last ammonia treatment. By means of these drying processes the final, neutral hydroxide is obtained in the form of hard grains which stand up well to wear and do not have any tendency to colloid formation.

EXAMPLE 1

A product having a particularly high ability to absorb iron, nickel, chromium, copper and zinc, intended for purifying the coolant water in a nuclear reactor, was manufactured in the following manner:

6 litres of 0.75 M $H_3PO_4$ was added by drops to a solution of 1.5 mol (400.8 g.) $ZrO(NO_3)_2.2H_2O$ in 4 litres of 1 M $HNO_3$, the mixture being stirred. While being stirred the precipitate was allowed to remain in contact with the mother liquor during a period of five days. The precipitated gel was separated by means of centrifugal separation, suspended in 10 litres of 1% $H_3PO_4$, and separated from the washing solution by centrifugal separation. The gel was then dried at 50° C. until the weight of decrease ceased, which required two days. The dried gel was crushed to a coarse powder which was then boiled for 6 hours with 3 litres of a water solution of phosphoric acid having a concentration of 6 mol/l. The mixture was then allowed to cool, after which the powder was separated by means of centrifugal separation and washed twice with 10 litres of water each time, after which it was separated from the washing solution by means of centrifugal separation and dried at 50° C. After the drying process fine particles were separated by means of decanting, after which the gel was washed free from remaining phosphoric acid in a column.

EXAMPLE 2

267 g. zirconyl nitrate was dissolved in 3 litres of water. It should be pointed out that commercial quality of zirconyl nitrate has a somewhat varying composition which, however, generally corresponds approximately to the formula $ZrO(NO_3)_2.2H_2O$. These litres of a 1 M ammonia solution was added dropwise while stirring, whereupon zirconium hydroxide was precipitated. Assuming that the composition of the hydroxide corresponds to the formula $ZrO(OH)_2$, ammonia had thus been added in 50% excess. After the precipitation, the stirring was continued until the ammonia concentration in the solution no longer dropped, which took about twenty-four hours. The precipitation had now consumed 1.8–1.9 mol $NH_3$ per mol Zr. The precipitate was separated from the solution by centrifugal separation and was dried at 50° C.

The dried precipitate was shaken with 0.25 litre 5 M ammonia solution for about 8 hours at ambient temperature. The powder was then separated from the solution by centrifugal separation, dried at 50° C. and submitted to another ammonia treatment of the type described above. After separation and drying at 50° C., the powder was poured into a column and washed by allowing about 15 litres of water to run through the column for 8 hours. The powder was finally dried at a temperature of 40–50° C. The water content of the powder after the drying was 15–25%, corresponding to the formula $ZrO_2.nH_2O$, $n$ lying between 1.2 and 2.3. The zirconium hydroxide obtained in this way was neutral, giving a pH value of 6–8 to water with which it came into contact.

EXAMPLE 3

Two columns were connected one after the other, the first containing zirconium phosphate produced in accordance with Example 1, and the second containing zirconium hydroxide produced in accordance with Example 2. The weight ratio phosphate:hydroxide was about 1:5, and the corresponding column ratio was about 1:3. Water was passed through the columns, the water having a temperature of 100° C. and containing 0.1 mM. (about 6 p.p.m.) iron (III), 0.1 mM. (about 6 p.p.m. nickel (II) and 5 mM. sodium acetate to give a pH value of 6–8. The first column absorbed nickel (II) to a total quantity of about 2.3 mM. per gram phosphate, and iron (III) to a total quantity of about 1 mM. per gram phosphate, before iron or nickel could be observed in the water leaving the column. The lower analysis limit for iron and nickel lay at about 0.005 p.p.m. The absorption of nickel corresponded to about ⅔ of the phosphate's theoretical capacity for two-valency ions, defined as half the concentration of $PHO_4$ groups in the phosphate, which was about 7.5 mM. per gram phosphate.

The phosphate ions liberated from the zirconium phosphate during the metal absorption were absorbed almost completely in the zirconium hydroxide in the second column. At the moment when nickel could be observed in the water leaving the first column, the content of phosphate ions in the water leaving the second column was about 0.2 p.p.m.

The flow rate of the water through the columns was 1000 cm.³/hour·cm.², corresponding to a theoretical contact time between water and phosphate of about 20 seconds, and between water and hydroxide of about 60 seconds. The pressure drop over the columns was about 0.5 kg./cm.². Since the available space for the water in the columns was approximately half the total volume, the true contact times were about half those stated above.

What is claimed is:

1. A method of purifying water, comprising initially passing the water through a bed of granular zirconium phosphate in crystalline form, the majority of the crystals having a size of 100 x 200–1000 x 2000 A., and subsequently removing the phosphate inevitably released during said initial treatment by passing the water through a bed of granular zirconium hydroxide produced by allowing a zirconium salt in a water solution to react with ammonia, after which the precipitated zirconium hydroxide is treated with a water solution of ammonia in a concentration of 3–6 mol/l.

2. Method of preparing water of a purity suitable for coolant water for a nuclear reactor, which comprises contacting water with zirconium phosphate which has been produced by allowing a zirconium salt in a water solution to react with phosphate ions, suitable in the form of phosphoric acid, to form zirconium phosphate, drying the zirconium phosphate thus precipitated at a temperature of 25–75° C., and then treating the dried zirconium phosphate with a water solution of phosphoric acid having a concentration of 3M–6M for a period of 24–1 hours at a temperature of from at least 100° C. to the boiling point of the phosphoric acid solution, and removing phosphate ions thus released by contacting the water with zirconium hydroxide produced by allowing a zirconium salt in a water solution to react with ammonia, after which the precipitated zirconium hydroxide is treated with a water solution of ammonia in a concentration of 3–6 mol/l.

References Cited

UNITED STATES PATENTS 3,332,737   7/1967   Kraus _____ 210—38 X
3,484,216   12/1969  Ahrland _____ 210—38 X SAMIH N. ZAHARNA, Primary Examiner U.S. Cl. X.R.

23—50, 337; 210—38